Dec. 25, 1934.  R. B. MILLER  1,985,681
AUTOMOBILE WHEEL
Filed May 15, 1931  2 Sheets-Sheet 1

Inventor
RICHARD B. MILLER
By Richey & Watts
Attorneys

Dec. 25, 1934.　　　R. B. MILLER　　　1,985,681
AUTOMOBILE WHEEL
Filed May 15, 1931　　2 Sheets-Sheet 2
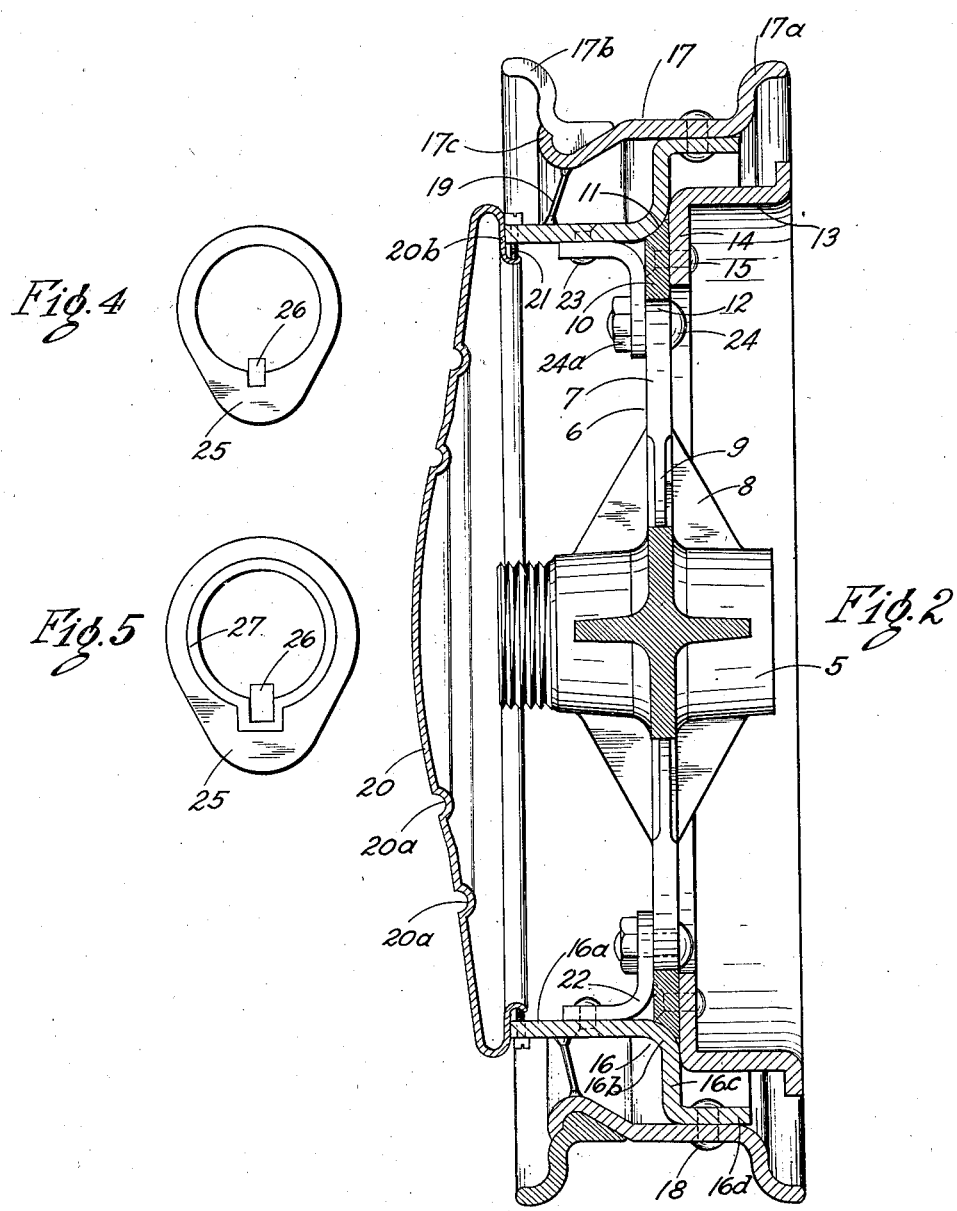
Inventor
RICHARD B. MILLER
By Richey & Watts
Attorneys Patented Dec. 25, 1934

1,985,681

UNITED STATES PATENT OFFICE 1,985,681

AUTOMOBILE WHEEL

Richard B. Miller, Cleveland, Ohio

Application May 15, 1931, Serial No. 537,570

8 Claims. (Cl. 301—6)

This invention relates to wheels for motor vehicles, and an object of the same is to provide a metal wheel assembly which is particularly adapted for tires of the low pressure or balloon type commonly used on passenger or light duty vehicles, altho not restricted thereto, the parts of the wheel when assembled constituting a strong and durable yet relatively light and attractive wheel which may be economically manufactured.

Another object of the invention is to provide a metal wheel assembly embodying a main wheel supporting member which may be cast or forged as an integral unit, and a rim and supporting assembly therefor which may be demountably engaged with said supporting member, the wheel from the exterior presenting the appearance of a wire spoked wheel having a central nave covering shell member which occupies the greater area of the wheel diameter, the shell when removed exposing the means for demountably securing the rim and shell assembly in position.

A further object of the invention is to provide a metal wheel assembly having an integral hub and wheel-supporting member which may be readily cast or forged into a unitary structure, together with a rim and supporting means therefor and a nave-covering shell member, which when assembled with the wheel-supporting member constitute an open nave type wheel which is relatively light in weight and simulates from exterior view a decorative solid central hub portion and a relatively short wire spoke spider portion.

The foregoing and other objects and advantages will become apparent in view of the following description taken in conjunction with the drawings, wherein:

Fig. 2 is a view substantially in transverse vertical section of the wheel in assembled condition;

Figs. 4 and 5 are detail views in end elevation of the hub barrel, showing different methods of reinforcing the spline connection with a drive axle.

Figure 1:
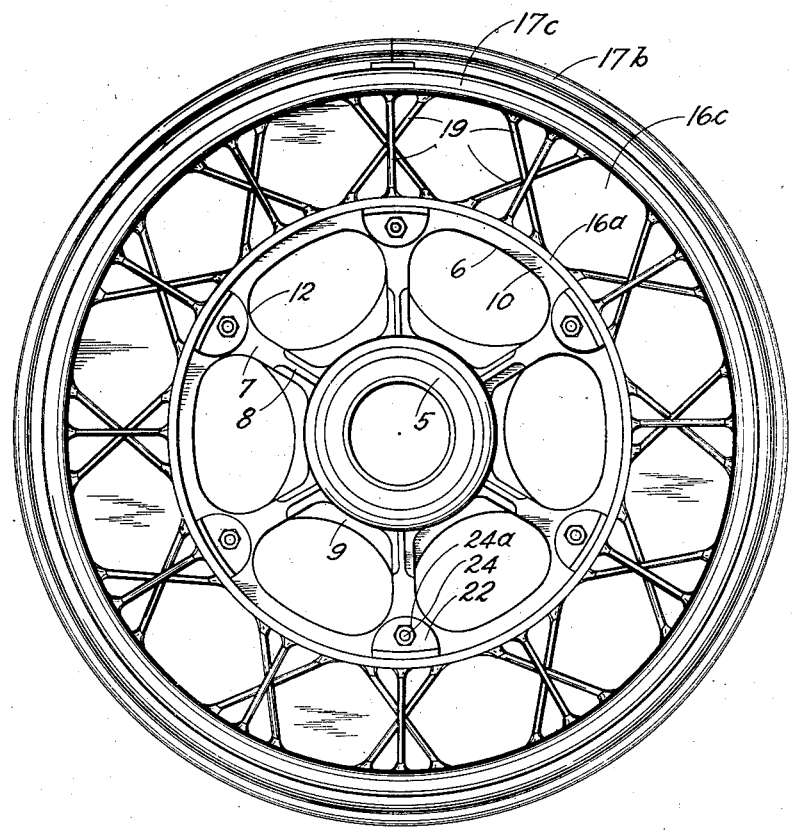
Figure 1 is a view in outboard side elevation of the improved wheel with the nave covering shell member removed to show the interior construction of the wheel.
Figure 3:
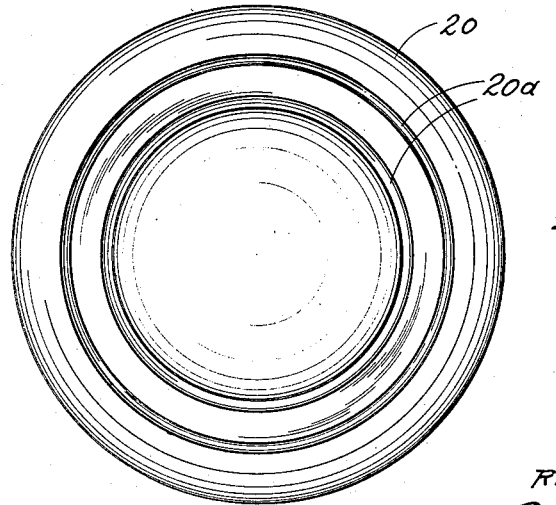
Fig. 3 is a partial view of the shell member as it appears from the exterior of the wheel.

Referring to the drawings in detail, the main wheel-supporting member comprises a hub barrel 5 having formed integrally therewith, and projecting substantially radially from the intermediate portion thereof a spider-like wheel-supporting member 6. This member 6 is preferably of open central construction defined by a plurality of ribs 7, which are reinforced by transversely disposed ribs 8, the latter at their bases preferably extending for substantially the full transverse width of the hub barrel and tapering radially at their points of jointure to the ribs 7. Between the ribs 7, reinforcing web portions 9 are formed, and these web portions together with the transversely disposed ribs 8 constitute a strong reinforcement against torque and lateral stresses imposed on the wheel-supporting member while in service on the road.

At their outer extremities, the ribs 7 merge with a peripheral wall 10, which as shown extends radially and terminates in a beveled periphery 11. At their points of merger with said wall, the ribs 7 are further reinforced by fillets 12.

It will be noted that the wheel-supporting member constitutes an integral structure which may be readily cast or forged, the arrangement of the spider-like central portion being such as to strongly reinforce the wheel member against side strains and torque thrust while in service on the road.

The construction of the main wheel-supporting member is well adapted for the use of a brake drum 13 having a relatively short attaching flange or web 14, which is suitably secured to the peripheral wall 10, as at 15. The method of securement, as shown in the present instance, is in the form of rivets, altho the said web may be secured to said wall either permanently or demountably as may be desired and in any suitable manner. A brake drum of this type is desirable in view of the fact that it may be economically manufactured (as by rolling or stamping) of relatively hard wear resisting material without utilizing a costly amount of metal and without setting up strains in the metal. The fact that the brake drum has a relatively short flange tends materially to facilitate manufacture of the drum.

Mounted on the main wheel supporting member is a demountable wheel unit, comprising a substantially cylindrical rim-supporting and mounting member, generally indicated at 16. The outboard side of the member 16 is extended transversely as at 16a, preferably to such an extent as will bring it approximately in alinement with the end of the hub barrel. At a point which will bring it in substantial radial alinement with the peripheral wall 11, the member 16 is turned, as at 16b, and extends substantially radially, as at 16c, and terminates in a transverse portion or rim-attaching flange 16d. The transverse portion 16d is preferably permanently secured to the base of a tire rim, generally indicated at 17, such as by rivets or analogous means 18. The angle formed between the radial portion 16c and the transverse portion 16a of the member 16 seats snugly on the tapered portion 11 of the peripheral wall 10 against the web wall 14 of the brake drum 13, and is clamped thereagainst in a manner to be described.

The rim, as here shown, is of the demountable gutter type and is formed with an inboard flange 17a, a demountable outboard flange 17b and an annular hook portion or gutter 17c in which the flange 17b is demountably engaged. While I have here shown, and do preferably use a rim of the demountable flange type, yet it will be understood that the conventional drop center or other rim may be employed as desired and in accordance with the type of tire to be applied to the rim.

In order to have the wheel member simulate the appearance of a wire spoked wheel and also to form a more rigid engagement between the rim-supporting member 16 and the rim 17, a series of relatively short wire spokes 19 are connected in any suitable manner at one end to the gutter portion 17c of the rim 17 and at their opposite ends to the periphery of the outboard portion 16a of the rim-mounting member 16. In the present instance, I have shown these spokes as being welded at their opposite ends to the respective parts. These spokes may be readily secured in position since they do not form the main support for the rim and no accurate tensioning is required, and are in a sense decorative members to enhance the appearance of the wheel altho they do serve as a rigid reinforcing structure. Any suitable number of these spokes may be employed and arranged in any particular manner to suit the manufacturer.

Associated with the outboard edge of the rim-mounting and supporting member 16 is a nave-covering shell member 20, which may be given an attractive design as at 20a and is formed with annular inturned edge 20b adapted to telescope into the portion 16a of the member 16 and be engaged by fillister screws 21. This is simply one method of detachably securing the shell in position, and it will be understood that the same may have a snap engagement with the portion 16a of the member 16 or secured thereto in any suitable well known manner. While I have shown the shell member as having a slight outward convexity or rounded contour, it will be understood that the same may be given various shapes and embellished in any suitable manner to enhance the appearance of the wheel and in accordance with the requirements of the manufacturer or the maker of the car to which it is to be applied. The shell 20 together with the outboard portion 16a of the rim-supporting member 16 completely houses the entire central nave portion of the wheel.

Associated with the interior of the portion 16a of the rim-mounting member 16 are a plurality of angle-shaped mounting brackets 22. As shown, these brackets are fastened at one end to the wall or portion 16a by means of rivets 23, but may be secured thereto in any suitable manner. At their opposite ends, the brackets are demountably secured to the outboard side of the radial wheel-supporting member 6 at a point where the ribs 7 merge with the wall 10 by bolts 24 and nuts 24a. Any number of these rim-mounting brackets may be employed, or said brackets may be replaced by a unitary member without departing from the scope of the invention.

In Figs. 4 and 5, I have shown methods of mounting the hub barrel on the axle shaft. Since this member is preferably forged or cast as an integral unit, it may be desirable to reinforce the spline engagement with the axle when the wheel is used as a driving wheel. With this in view, the hub barrel may be formed with a thickened portion as at 25, at the point where the key 26 connects the drive shaft with the said barrel. In Fig. 5, I have shown a hard metal liner 27 which receives the key and prevents damage to the metal of the hub barrel due to torque stresses set up by the driving action.

It will be noted that the wheel-supporting member extends for substantially the greater portion of the wheel diameter, and that the shape of the rim-mounting and supporting member 16 permits the use of a nave covering shell which simulates an enlarged hub cap terminating at the base of the wire spokes 19. By this arrangement, the wheel is not only rendered unusually light, self-ventilating, yet strong and durable, but is also particularly adapted for the popular low pressure tires of the exaggerated balloon type.

To demount the rim and supporting assembly, it is only necessary to remove shell 20 and remove nuts 24a, and since the rim-mounting brackets 22 and nuts 24a are housed by the said shell and wall 16a of member 16, they will be maintained free of dirt and water and will not rust or become difficult to remove as in the exposed type of mounting bracket.

It will be understood that various changes in structure and modifications in design may be adopted within the scope of the invention as defined by the appended claims.

Having thus described my invention, what I desire to secure by Letters Patent is:

1. A metal wheel assembly for motor vehicles, comprising a hub barrel having formed integral therewith a spider-like supporting wall adapted to serve as a support for the wheel assembly parts and extended radially for the greater portion of the wheel assembly diameter, a brake drum having a short attaching flange which is secured to the periphery of said wall, a tire-rim member, a transversely-extended substantially cylindrical rim-supporting member which at its inboard side is flared radially and fits against the periphery of the spider wall and drum flange and terminates in a transverse flange which is secured to said rim, a series of short wire spokes joined to the periphery of the rim-supporting member and the base of said tire-rim, mounting members permanently secured to the radially inner side of said rim-supporting member and demountably secured to said supporting wall, and a nave-covering shell removably attached to the outboard edge of the rim-supporting member.

2. A metal wheel assembly for motor vehicles, comprising a hub barrel having formed integrally therewith a spider-like supporting wall which is extended radially for the greater portion of the wheel assembly diameter, ribs formed integral with said barrel and wall and extending transversely from the former toward the latter, to reinforce the wall against lateral stresses, a brake drum having a short attaching flange which is secured to the peripheral inboard side of said wall and projects radially therebeyond, and a demountable wire-spoke and rim assembly mounted on said wall and in contact with said drum, said assembly comprising a substantially cylindrical member which extends transversely over the periphery of said supporting wall and wedges against the drum and is formed with a radially-outwardly-turned portion which rests thereon and terminates in a transverse flange, a tire rim attached to said flange, a series of wire spokes connecting said cylindrical member and the outboard side of the rim, mounting means permanently secured to said cylindrical member and demountably secured to said supporting wall, and a nave-covering shell detachably carried by said cylindrical member.

3. A metal wheel assembly for motor vehicles, comprising an integral hub barrel and a spider-like supporting wall which is extended radially for the greater portion of the wheel assembly diameter, and a demountable wire spoke and rim assembly mounted on said wall, said assembly comprising a tire rim, a substantially cylindrical member which is extended transversely of the rim and is secured to the base thereof, said member being formed with a radially inward curved portion which rests on the periphery of said wall, a series of wire spokes connected to said cylindrical member, and said rim, and a series of brackets each of which has one end permanently secured to said cylindrical member and the opposite end demountably secured to the supporting wall.

4. In a metal wheel assembly for motor vehicles, an integral hub and radially extended supporting wall of open spider-like construction, said wall being joined to the hub at a point to form a strong connection therebetween, ribs on each side of said wall connecting the wall with the said hub to brace the wall against lateral stresses, the periphery of said wall being provided with a bearing surface, a brake drum having a short attaching flange secured to said wall, a tire rim, the periphery of said wall and drum lying in proximity to said rim, a substantially cylindrical member having a portion which lies in substantially transverse alinement with the periphery of said wall and a radially turned portion which rests on said periphery bearing surface and in wedged contact with said drum flange and terminates in a transverse portion which is secured to the base of said rim, a series of wire spokes connected to the periphery of the cylindrical member and the outboard side of said rim, a plurality of angle brackets each having one end thereof permanently secured to said cylindrical member and the opposite end demountably secured to said wall, and a nave-covering shell detachably secured to the outboard edge portion of the cylindrical member.

5. A metal wheel assembly for motor vehicles, comprising a hub barrel having formed integral therewith a supporting wall which projects radially from the intermediate portion of said barrel and extends for the greater portion of the wheel diameter, a brake drum member secured to said wall, a tire rim, a substantially cylindrically-shaped rim-supporting member formed with an outboard transversely-extending portion which is supported on the periphery of the supporting wall and is demountably secured to the latter and extends radially for a relatively short distance substantially in alinement with the supporting wall and terminates in a transverse inboard portion which is secured to said rim, a series of short wire spokes joined to the periphery of said transversely-extending outboard portion of the rim-supporting member and said rim, and a nave-covering shell associated with the outboard edge of said transversely-extending outboard portion and covering the entire hub and supporting wall.

6. A metal wheel assembly for motor vehicles, comprising a hub barrel having formed integral therewith a supporting wall which is projected radially from an intermediate portion of said barrel and extends for the greater portion of the wheel diameter, a brake drum member secured to said wall, a tire rim, a substantially cylindrically-shaped rim-supporting member formed with a transversely-extending outboard portion which is supported on the periphery of the supporting wall in contact with the brake drum member and extends radially substantially in radial alinement with said wall and terminates in a transverse inboard portion which is secured to said rim, a series of short wire spokes connecting the periphery of said outboard portion of the rim-supporting member and said rim, mounting means connected to the said outboard portion of the rim-supporting member and housed by the latter and adapted for demountable engagement with the said supporting wall, and a nave-covering shell associated with the outboard edge of said rim-supporting member and covering the entire hub and supporting wall.

7. In a metal wheel assembly for motor vehicles, an integral hub and radially-extended supporting wall, said wall being projected from said hub at an intermediate point, a tire rim, said wall being extended radially to a point in proximity to said rim, a substantially cylindrical rim-supporting member which extends at its outboard side in substantially transverse alinement with the periphery of said wall and is turned radially in substantially radial alinement with said wall and formed with a transverse inboard portion which is permanently secured to the base of said rim, the radially-turned portion of said member resting on the periphery of the said supporting wall and transmitting the load in a substantially straight line from the rim to the hub thru said wall, a series of wire spokes connecting the cylindrical member and the base of said rim, and means for demountably securing said cylindrical member to the supporting wall.

8. A wheel for motor vehicles comprising: a central member having a hub and a wheel supporting nave wall of open spider-like construction which extends substantially radially from the hub for the greater area of the wheel diameter; and a demountable assembly comprising a tire rim, a transversely-extended radially-offset rim-supporting and mounting member seated on the periphery of said nave wall and having its periphery fixed to the base of the rim, a series of short wire spokes joined to the base of said rim and the periphery of said rim-supporting and mounting member and serving as a decorative and an auxiliary fastening means, means for demountably securing said latter member to said nave wall, and a shell member detachably associated with the outboard edge of said rim-supporting and mounting member to complete the contour of the wheel and protect the nave area thereof.

RICHARD B. MILLER.